INVENTOR:
William J. Miller
BY Israel Benjamin.
ATTORNEY

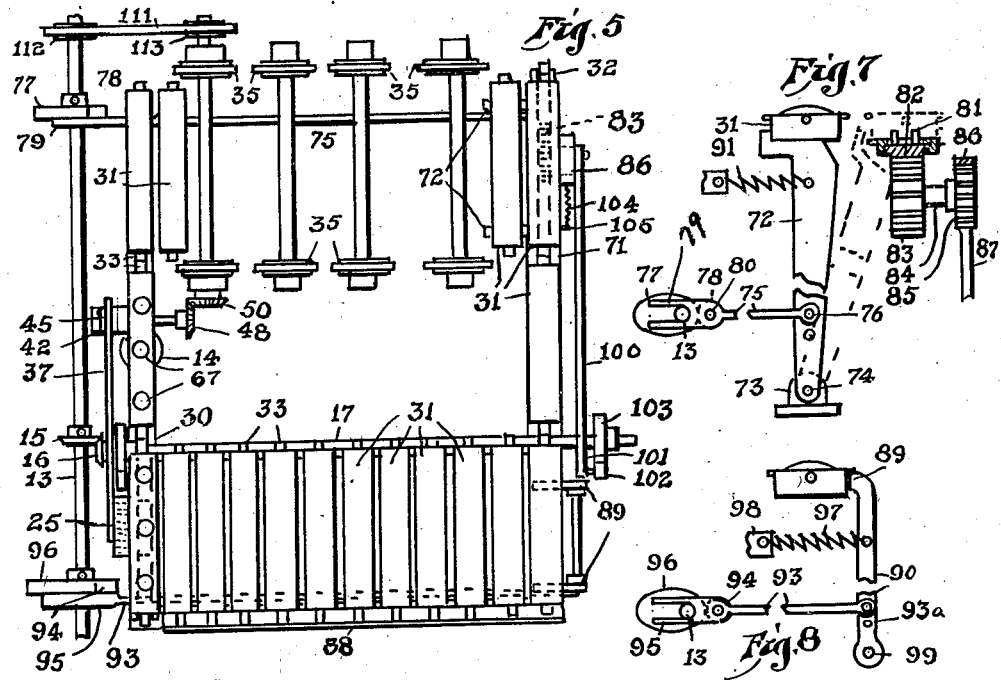
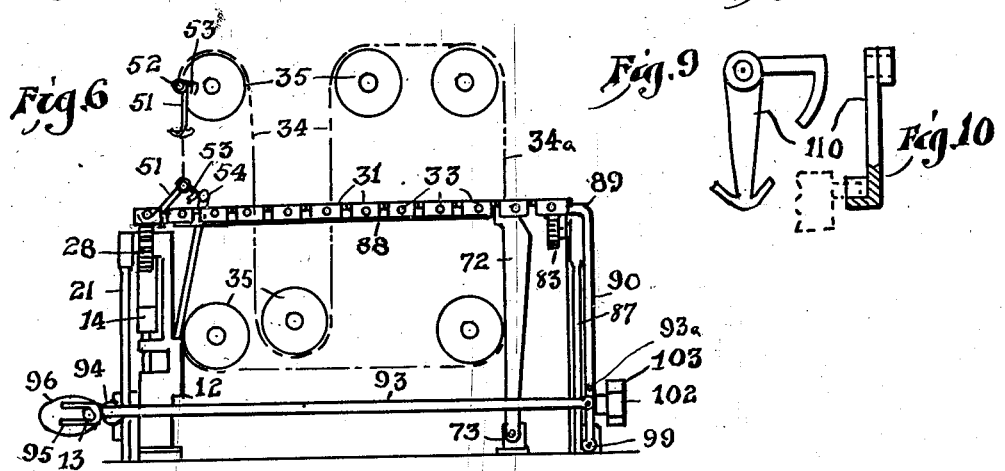
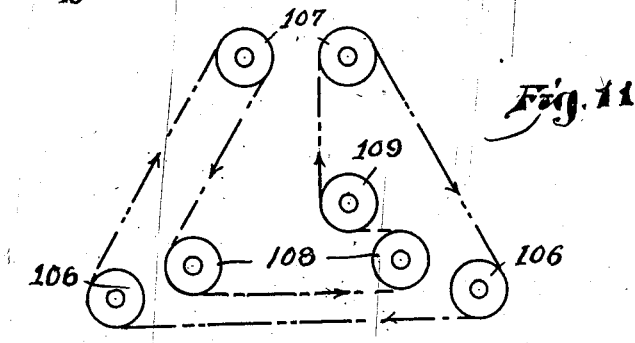

Patented May 30, 1939

2,160,483

UNITED STATES PATENT OFFICE 2,160,483

APPARATUS FOR THE MANUFACTURE OF POTTERY WARE

William J. Miller, Swissvale, Pa.

Substitute for abandoned application Serial No. 163,421, January 25, 1927. This application April 3, 1935, Serial No. 14,446

24 Claims. (Cl. 25—2)

My invention relates to improvements in the manufacture of articles from plastic materials and particularly in the art of making pottery, and it consists in the novel features, which are hereinafter described.

This application is a substitute for application 163,421 filed January 25, 1927.

The objects of my invention are to provide a means for automatically loading carriers with molds thereon onto a conveyor, after the charge on said molds has been shaped by jiggers, to be transported to any required destination, such as to a dryer; to have said means applicable to multiple jiggers, such as described in my Patent #1,757,132 for Multiple and automatic jiggers for use in the manufacture of articles from plastic materials; to allow the ready removal and replacement of defective or damaged carriers on conveyors without interfering with the operation of the plant; to facilitate the manipulation of carriers containing multiple molds after the initial operation of shaping the material on said molds has been completed; to save time and labor, which would otherwise be expended in manually loading mold carriers onto conveyors; to have a complete automatic cycle of operations performed on the material, from the operation of feeding a charge of material onto the mold to the production of the finished product without removing the mold carriers from the machine during said cycle of operations and without removing the molds from the carriers except as required during fabrication.

In the drawings:

Fig. 1 is a fragmentary side elevation of my mechanism for conveying mold carriers looking from left to right in Figs. 3 and 6 showing the middle part and the left hand end thereof as broken away. Fig. 2 is a fragmentary plan of apparatus of Fig. 1. Fig. 3 is a fragmentary front elevation, of the apparatus of Fig. 1.

Fig. 5 is a diagrammatic top plan view of my mechanism for conveying mold carriers, showing the complete route of the same from the jiggers to the dryer, through the latter and back again to the jiggers.

Figures 1, 2, 3, 4:
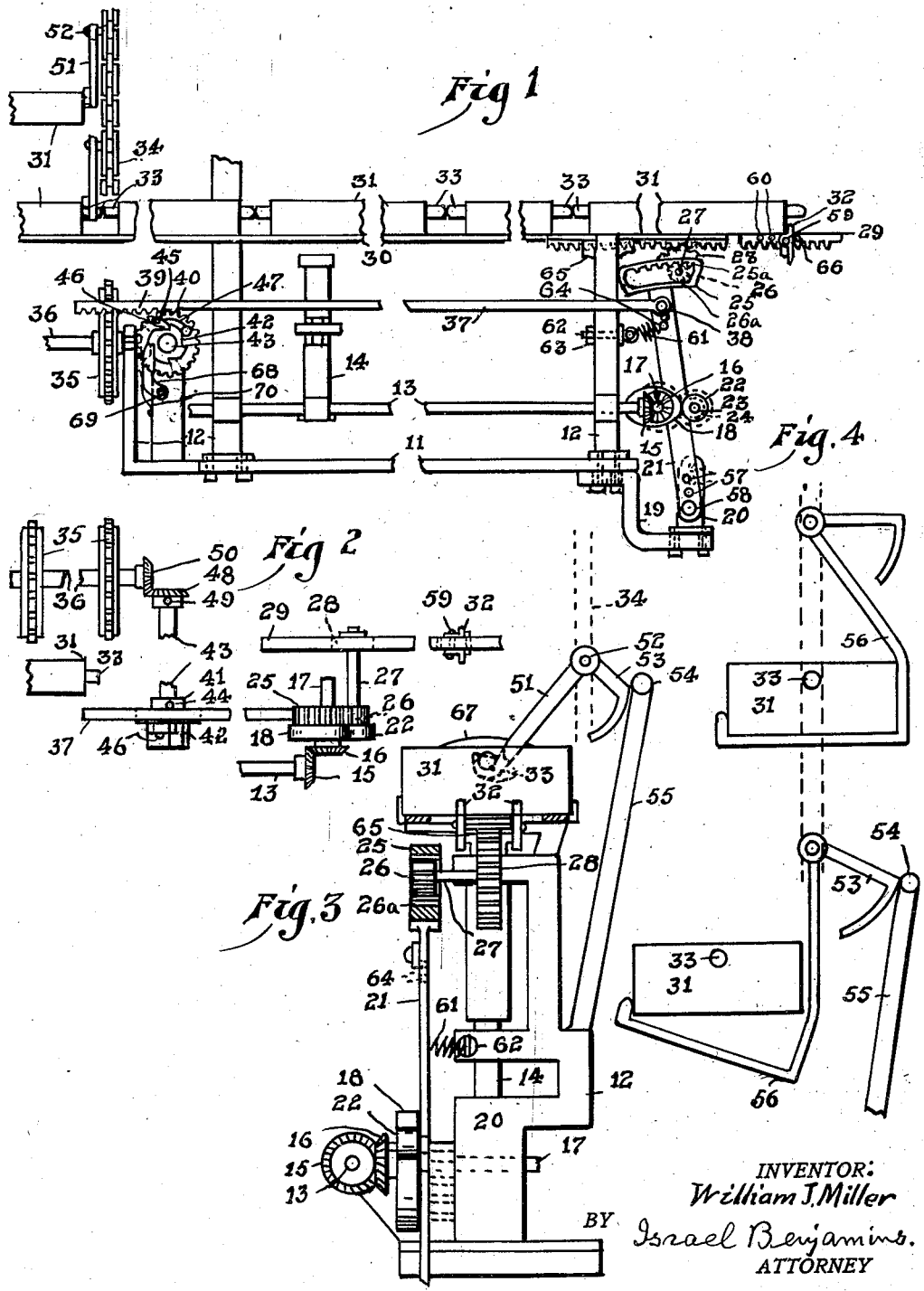
Fig. 4 is a detail in front elevation of a modification of my mechanism for conveying mold carriers.

Fig. 6 is a diagrammatic front view of my mechanism shown in Fig. 5. Fig. 7 is a detail view in front elevation of a device for transferring mold carriers from an endless chain conveyor, which forms part of my mechanism to a return track, Fig. 8 is a detail in front elevation of a device for transferring mold carriers from said return track to another track, and for propelling them along said other track.

Figs. 9 and 10 are a front view and a side view respectively of a detail of a chain hook, which is employed in a modification shown in Fig. 11.

Fig. 11 is a diagrammatic front elevation of a modification of the conveying means of my mechanism for conveying mold carriers.

In Fig. 1, 11 is a base plate and 12 a frame of multiple and automatic jiggers, such as described in my abovementioned patent and 13 is a power shaft, supported by the frame for operating the ware fabricating and/or jigger units disclosed therein as generally represented by the jigger chuck 14 defining the general location thereof.

A mitre gear 15 Figs. 1 and 3 mounted at the one end of shaft 13 meshes with another mitre gear 16, mounted at the end of a shaft 17, having a cam 18 thereon. Bracket 19 secured to base 11 by fastenings 19a has secured thereto a bearing 20 for an oscillating arm 21 and is pivotally connected to a bearing 20 by a spindle 58 in one of multiple interchangeable openings 57 in the bearing 20 and in arm 21. These openings 57 are located opposite the openings 57 in arm 21, and are for varying and adjusting the operating length of arm 21.

A roll 22 pivotally connected by a pin 23 to a boss 24 on arm 21, is in contact with cam 18, whereby arm 21 is periodically turned in one direction. A tensile spring 61, Figs. 1 and 3, is connected to arm 21 a screw 62 adjustably connected to frame 12, and is secured by a safety nut 63.

The spring 61 returns arm 21 to its original position after the latter has been displaced by said cam 18, and, in conjunction with cam 18, oscillates arm 21 about spindle 58 as an axis.

A slotted segmental gear 25, having internal teeth 25a at the upper edge of its slot, is situated at the upper end of arm 21 in mesh with the upper edge of pinion 26, on spindle 27; a clearance 26a being shown in Fig. 1 between the lower edge of pinion 26 and the lower edge of the slot in said segmental gear 25.

The spindle 27 also carries a pinion 28, of greater diameter than pinion 26, in mesh with a rack 29. The latter is slidably mounted on frame 12, in an inverted position, Figs. 1 and 3; and may be positioned to move to and fro over one end of the frame 12 intermediate of two rails of a track 30, secured to the frame 12. One or more gravity pawls 32 are pivotally connected to the rack by a spindle 59 and one of multiple interchangeable openings 60 in the rack 29, to rotate thereon in one direction. A stop 66 is also secured to the rack, to check the rotation of the pawls in the opposite direction.

Mold carriers 31, having molds 67 mounted thereon are slidably mounted on track 30 over chucks 14 where the material applied to the molds and shaped by dies and/or said jiggers, as described in my patents above. The carriers 31 are intermittently moved rearwardly in a line on track 30, in the direction from right to left, in Fig. 1, by the gravity, pawls 32 and rack 29, Figs. 1 and 3, to be picked up by hooks on chains 34, hereinafter described.

The multiple openings 60 in rack 29 for spindle 59 of pawls 32 serve to adjust the position of carriers 31 on the tracks 30 over the jiggers. The adjustment at 57 provides for the accommodation of different lengths of the carriers 31.

The carriers 31, have axial trunnions 33, Figs. 1 and 3, parallel to the track 30 and rack 29; which serve as buffers for said carriers 31, when on track said carriers 30, and co-operate with hooks for attachment to the chain conveyor of the dryer.

These chains 34 are in engagement with sprockets 35, Figs. 1 and 2, mounted on a shaft 36; the other chain 34 and the remaining sprockets 35 being omitted in the drawings. A connecting rod 37 pivotally connected by pin 38 to an arm 21, having a multiple of interchangeable openings 64 for the pin enables the stroke of rod 37 to be varied. The rod has an inverted rack 39, in mesh with a pinion 40 swivelled on the hub 41 of a ratchet 42. The hub 41 adjustably secured to a spindle 43 by a screw 44 and pawl 45 pivotally connected to pinion 40 by a pin 46, is kept in engagement with said ratchet 42 by a plate spring 47, secured to the pinion 40.

By means of connecting rod 37 motion is transmitted from arm 21 to the pinion 40 with the pawl 45 thereon. The stroke of rod 37 may be varied and adjusted by means of openings 64 and 57 on the arm 21. The pawl 45 is kept by spring 47 in intermittent engagement with ratchet 42 during the oscillation of pinion 40 in one direction, whereby the ratchet 42 is intermittently turned in a clockwise direction during the interval of time when rack 29, with pawls 32 thereon, is moving from left to right, Fig. 1 and when carriers 31 are normally resting on the track 30 in operative adjacency to the ware fabricating apparatus.

A bevel gear 48, Fig. 2, adjustably secured by means of screw 49 to spindle 43, is in mesh with bevel gear 50, mounted on spindle 36, whereby the latter, with the sprockets 35 thereon, has imparted thereto an intermittent rotation in one direction, thereby intermittently moving chains 34 upwardly at the right side of said carriers 31, Fig. 3, during the interval of time when carriers 31 are normally at rest on track 30 whilst fabrication of ware on the molds carried thereby is proceeding, the chucks lifting said molds off the carriers into cooperation with the dies and jiggers.

To prevent rotation of sprockets 35 in the opposite direction under load carried by said chains 34, an additional pawl 68 is pivotally connected to the frame 12 by pin 69, and engages a ratchet 42 being held in engagement by a plate spring 70, secured at one end thereof to frame 12.

Hooks 51, Fig. 3, pivotally connected to chains 34 by pins 52, have formed integrally therewith cams 53, for engagement with a stationary guide bar 54, mounted on frame 12 by a bracket 55, Fig. 3.

The action of said guide bar 54 on cams 53 causes the hooks 51 to be swung on their pivots 52 and pass through slots in track 30 and be brought into the position shown; thereby engaging the underside of trunnions 33 at the ends of carriers 31, shown in Fig. 1 at the rear end of said track 30. As the chain moves upwardly a carrier is lifted off the track 30, and moved a predetermined distance vertically whilst gradually swinging to the right, Fig. 3, towards centered position as regards the chain 34, as the cams 53 leave the guide bar 54. The chain is intermittently moved and other carriers 31 are picked up in successive order and conveyed to any required destination preferably to and through a dryer. The chains 34 are at rest when carriers 31 are being moved from right to left over the chucks, Fig. 1.

The modification of Fig. 4 discloses L-shaped cam hooks 56, which engage to the underside of carriers 31, eliminating the use of trunnions 33. Otherwise the action of the hooks 56 is similar to the action of the hooks 51.

The phase of motion of chains 34 and the hooks 51 or 56 thereon with relation to carriers 31 may be determined by the sundry adjusting means hereinbefore described, and also by the spacing of hooks 51 or 56 on chains 34.

The chain conveyor 34 on being loaded with mold carriers 31 as hereinbefore described, may carry them over a system of sprockets 35, in which the chains 34 are arranged in multiple vertical branches passing over and under sprockets 35, to save space, Figs. 5 and 6, through a dryer or other treating chambers, until the ware is finished and removed therefrom in any suitable manner.

The chains 34 may also be arranged to run horizontally or in inclined planes, also in combined vertical, horizontal and inclined directions, Fig. 11, wherein the chains 34 are arranged to pass over sprockets 106, 107, 108 and 109 having hooks 110 thereon, to pick up mold carriers 31 from track 30 and deposit the same on track 71, as hereinafter described.

The mold carriers 31 after traversing the dryer are automatically transferred from the part 34a of conveyor chains 34, Fig. 6, to a track 71, situated at the right side of my mechanism as shown, Figs. 5 and 6, by means of a pair of oscillating transfer members 72, pivotally connected to the machine frame or mounted in bearings 73 by means of a spindle 74, to which each of said members 72 may be adjustably secured.

The carriers 31 are deposited by the conveyor chains 34 on the members 72, which intercept carriers 31 from chains 34a when the members 72 are in the position shown in full lines in Fig. 7, and the carriers 31 are thereafter transferred to track 71, when members 72 are oscillated into the position shown in dotted lines in Fig. 7. The shoulders of members 72 are notched to pass under the sill of track 71.

To oscillate members 72 I provide a connecting rod 75, pivotally connected to member 72 by a pin 76. The rod terminates in a bifurcation 79, in which shaft 13 lies, Figs. 5 and 7 and has adjustably secured thereto a rotary cam 77, in contact with a roll 78, pivotally connected to the bifurcated part 79 by suitable pin 80.

A spring 91, Fig. 7, connected to members 72 and to a stationary part 92 of the machine, co-operates with cam 77, to oscillate members 72.

The carriers 31 are then propelled forwardly on track 71 by means of gravity pawls 81, connected to a rack 82, similar to the pawls 32 and rack 29 hereinbefore described, and act in the same manner.

The rack 82, Fig. 7, actuated by a pinion 83, which is mounted on a spindle 84, meshes with rack 82. The spindle also has a smaller pinion 85, in mesh with a segmental gear 86, (similar to gear 25) located on oscillating arm 87 actuated by connecting rod 100, pivotally connected to arm 87 and adjustably secured to a bifurcated part 101, slidably connected to shaft 17, Fig. 5.

A roll 102 pivotally connected to 101, contacts with a cam 103, adjustably connected to shaft 17. A compression spring 104 connected to arm 87 is also connected to a stationary part 105, for cooperating with and cam 103, to oscillate arm 87, thereby intermittently moving carriers 31 lengthwise thereof on track 71 forwardly as hereinbefore described and in their relative positions, Fig. 5.

From the track 71 the carriers 31 may be transferred to platform or track 88 situated at the front of the machine. A pair of pushers 89, connected to a pair of oscillating arms 90, Fig. 8 intermittently engages and so moves the carriers. These arms are secured to a spindle 99 and are actuated by a connecting rod 93, pivotally connected by interchangeable openings 93a to one of arms 90 and is slidably mounted on said shaft 13 by a slotted member 95 on rod 93. A cam roll 94 is pivotally connected to member 95 in contact with a cam 96, adjustably secured to shaft 13, Fig. 5.

A spring 97 connected to arm 90 and part 98, cooperates with cam 96 to oscillate arm 90.

The carriers 31 are arranged in a line on said platform or track 88, Fig. 5, and are intermittently propelled by pushers 89 in a direction from right to left in Fig. 5 until they reach the track 30, when the cycle of operations is completed, and is repeated as hereinbefore described.

The operations of the sundry parts of my mechanism for conveying mold carriers may be properly timed by the various adjustments, which are hereinbefore described.

The cycle of operations above mentioned may include also the operation of feeding material to the molds, to form a charge thereon, and the operation of preforming said charge on said molds preliminary to having said charge finally shaped by said jiggers.

My above mechanism may also preferably be employed with a continuously moving conveyor which may be operated by a belt 111 on pulleys 112 and 113, as shown in Fig. 5, if desired, and also with a continuously moving line of carriers, if desired. The pulley 112 may be secured to the power shaft 13 and pulley 113 secured to shaft 36, to operate them in synchronism.

When it is desired to run the said conveyor 34 continuously, the bevel gear 48 must first be shifted on spindle 43, until it is out of mesh with bevel gear 50, whereupon the belt 111 may be connected to pulleys 112 and 113; and when it is desired to run said conveyor 34 intermittently, the belt 111 must first be disconnected from one of pulleys 112 or 113, whereupon the bevel gear 48 may be shifted on spindle 43 into mesh with bevel gear 50, and then secured in position on spindle 43 by means of a set screw 49.

My above described mechanism may also be employed with conveyors, which are not vertically disposed as above described.

The mold carriers may also be removed from the line otherwise than by lifting them, as above described; and carriers may be moved in a line otherwise than on a track, and the line may be otherwise than straight, if desired.

A pair of cams substantially similar to the cam 53, but inverted in position as shown in Fig. 12 and generally designated 53a may be connected to the hooks of chains 34, to be intercepted during the downward motion of said chains 34, for unloading the carriers 31 therefrom, if desired. Cams may also be provided on the hooks of chains 34 for unloading carriers 31 when the chains are moving upwardly by an unloading member, which is moving upwardly at a higher velocity than said chains 34 if desired.

The point of unloading of the carriers 31 from chains 34 may be situated at a considerably higher level than the point of loading of carriers thereunto; the tendency of chains 34 at the loading point will then be to move downwardly, and will be checked by means of pawl 68, as above described.

Where the point of unloading of the mold carrier 31 from chains 34 is considerably lower than the point of loading of the carriers thereunto, the tendency of the chains 34 will be to move in the opposite direction or upwardly; the pawls 45 and 68 with the ratchet 42 may then be aided by suitable positive clutches or brake retarding means to keep said chains 34 from overrunning, if desired.

I claim:

1. In apparatus for the manufacture of pottery ware, in combination, a dryer and a conveyor operating therein having removable mold carriers, means for automatically removing and replacing mold carriers thereon, means for circulating said carriers between the points of removal and replacement and means for fabricating ware on the molds of said carrier incident to said circulation.

2. In apparatus for the manufacture of pottery ware, in combination, a dryer having a mold conveying means associated therewith, removable mold carriers pivotally attached to said conveying means, means for removing mold carriers therefrom, means for circulating said carriers to a zone of ware fabrication, means for jiggering ware on said molds and means for automatically replacing said carriers on said conveying means.

3. In apparatus for the manufacture of pottery ware, in combination, a dryer having a mold conveying means associated therewith, removable mold carriers attached thereto, means for automatically detaching said carriers from said conveyor, means for circulating said carriers to a ware fabricating zone, and means for fabricating ware on said molds.

4. In apparatus for the manufacture of pottery ware, in combination, apparatus for fabricating pottery ware, a mold carrier, means for transporting the carrier to and through the zone of ware fabrication, means for removing molds therefrom and replacing molds thereon, a dryer having a conveyor associated therewith and means for automatically attaching said carrier to said conveyor.

5. In apparatus for the manufacture of pottery ware, in combination, a dryer having a conveyor operating therein, a plurality of mold carriers attached to said conveyor, means for removing molds from said conveyor, means for circulating said molds to a zone of ware fabrication, means for progressing said molds therethrough, means for fabricating ware on said molds incident to said progression and means for returning said molds to said conveyor.

6. Apparatus for producing pottery ware comprising, in combination, an automatic ware fabricating apparatus, a dryer having a conveyor located therein, apparatus for transferring mold carriers from said conveyor to said fabricating apparatus, drive means for said fabricating apparatus, conveyor and transfer means and means for varying the speed of operation of said drive means.

7. Apparatus for the manufacture of pottery ware comprising, in combination, a single line automatic pottery ware fabricating machine, a mold conveyor having molds disposed thereon in rows extending transversely thereof, means for removing an entire row of molds at once from the conveyor, means for feeding said molds through said fabricating machine in single file and means for replacing molds an entire row at a time on said conveyor.

8. Apparatus for the manufacture of pottery ware comprising, in combination, a pottery ware fabricating apparatus, conveying means adjacent thereto having molds disposed thereon in spaced rows extending transversely of the conveying means, means for removing mold rows in consecutive order from said conveyor, means for feeding molds of a row through the fabricating machine, the rows following in consecutive order and means for replacing said molds in consecutive rows on said conveying means.

9. Apparatus for the manufacture of pottery ware which comprises, in combination, a single line automatic pottery ware fabricating machine, a conveyor for molds located adjacent thereto, molds disposed on said conveyor and arranged in spaced rows, transferring means for removing molds a row at a time from said conveyor, means for feeding said molds in single file to and through said pottery ware fabricating machine for the fabrication of pottery ware thereon, means for replacing molds with fabricated ware thereon on said conveyor, drive means for said conveyor, drive means for said pottery ware fabricating machine and mechanism for synchronizing the operation of said drive means.

10. Apparatus for the manufacture of pottery ware comprising, in combination, an automatic pottery ware fabricating machine, a dryer, a dryer conveyor operating in timed relation with said machine, molds carried by said conveyor, means for unloading empty molds from said conveyor, a second conveyor adapted to receive said molds and to feed the same in single file to said pottery ware machine, means for transporting said molds through the pottery machine and to a position where said molds may be loaded onto said conveyor again and means for loading filled molds on said dryer conveyor.

11. Apparatus for the manufacture of pottery ware comprising, in combination, an automatic pottery ware fabricating machine, a dryer, a dryer conveyor, molds disposed on said conveyor and arranged in rows extending transversely thereof, a second conveyor, means for transferring rows of molds to said second conveyor, a mold transfer associated with said pottery ware machine adapted to feed molds in single line therethrough for filling said molds being transported out of said pottery machine in single file and automatically replaced in rows on said dryer conveyor subsequent to filling.

12. Apparatus for the manufacture of pottery ware comprising, in combination, a dryer, a mold conveyor associated therewith, mold supports arranged transversely thereof, a pottery ware fabricating machine; means for detaching mold supports from said dryer conveyor and feeding the same in consecutive order through said fabricating machine and means for reattaching said carriers to said mold conveyor.

13. In apparatus for the manufacture of pottery ware, a dryer conveyor, a plurality of mold carriers, means for mounting said mold carriers on said conveyor comprising a plurality of attaching members pivotally associated with said conveyor and adapted to detachably support said mold carriers and means for rotating said attaching members about their respective axis to displace the carriers laterally relative to the path of travel of the conveyor.

14. In apparatus for the manufacture of pottery ware, in combination, stationary means for automatically fabricating pottery ware, a conveying means for molds located adjacent thereto, mold transferring means located intermediate said conveying means and said fabricating means for automatically transferring molds therebetween.

15. In the manufacture of pottery ware, ware fabricating means, a dryer, a chain mold conveyor in said dryer, and means for transferring molds between said dryer and said fabricating means including a mold carrier detachably associated with said chain conveyor.

16. In apparatus for the manufacture of pottery ware, ware fabricating means, a chain mold conveyor having removable mold carriers, means for detaching said carriers from said chain conveyor and a conveyor for transporting the same into operative adjacency to said fabricating means, and means for returning said carriers to said conveyor.

17. Apparatus for producing dinnerware, comprising, in combination, a dryer, a chain conveyor operating therein, means for actuating said conveyor, a plurality of removable carriers with molds thereon associated with said conveyor, means for removing said carriers from said conveyor, means for automatically advancing said carriers into operative adjacency to a ware fabricating zone, means for automatically removing molds from said carriers, means for fabricating ware thereon, and means for synchronizing the operation of said conveyor, said carrier advancing means and said fabricating means.

18. In apparatus for the manufacture of pottery ware, in combination, a dryer having a conveyor therein, mold carriers associated with said conveyor, means for removing said carriers from said conveyor located in the direct line of travel of said conveyor and means for replacing carriers on said conveyor.

19. In apparatus for the manufacture of pottery ware, a dryer having a chain conveyor for molds, removable mold carriers provided with mold positioning seats associated therewith and means for automatically removing and replacing said carriers on said conveyor.

20. In apparatus for the manufacture of pottery ware, a ware fabricating apparatus, a dryer, a conveyor for travelling molds through said dryer, mold carriers removably attached to said conveyor, and a conveying means operating in timed relation with said fabricating apparatus for transporting mold carriers to and from said fabricating apparatus.

21. Apparatus for the manufacture of pottery ware comprising, in combination, a dryer having an endless chain mold conveyor, a plurality of mold supports associated with said conveyor, molds on said supports, means for fabricating pottery ware located adjacent said conveyor and means for simultaneously transferring all of the molds on a single support in unison from said conveyor to said means for fabricating pottery ware.

22. Apparatus for the manufacture of pottery ware comprising, in combination, a dryer, a mold conveyor operating therein, a plurality of mold supports associated with said conveyor, molds on said supports, means for fabricating pottery ware located adjacent said conveyor, a mold conveyor associated with said means for fabricating pottery ware, means for transferring all of the molds on a single support in unison from said dryer conveyor to said conveying means associated with said fabricating apparatus and means for returning filled molds from the fabricating machine to the dryer.

23. In apparatus for the manufacture of pottery ware the combination which comprises a pottery ware fabricating machine, a dryer, a dryer conveyor for molds comprising a pair of chains having a plurality of mold carriers attached thereto by means of releasable securing members, means for actuating said securing members at predetermined points to enable the release and detachment of the carriers from said conveyor, means for progressing said carriers when released to and through said pottery ware fabricating machine and to a position where said securing members may engage and reconnect the carriers to the said conveyor.

24. In apparatus for the manufacture of pottery ware, the combination of a dryer having a conveyor operating therein, a plurality of mold carriers attached to said conveyor, means for mechanically removing a plurality of molds from said dryer conveyor, means for circulating said molds to another zone of said dryer conveyor for replacement thereon and means for fabricating ware on said molds incident to the said circulation thereof.

WILLIAM J. MILLER.